(12) United States Patent
Sayama

(10) Patent No.: US 9,007,661 B2
(45) Date of Patent: Apr. 14, 2015

(54) IMAGE READING DEVICE AND IMAGE FORMING APPARATUS

(71) Applicant: KYOCERA Document Solutions Inc., Osaka (JP)

(72) Inventor: Haruki Sayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/011,603

(22) Filed: Aug. 27, 2013

(65) Prior Publication Data

US 2014/0063571 A1 Mar. 6, 2014

(30) Foreign Application Priority Data

Aug. 29, 2012 (JP) .................. 2012-188292

(51) Int. Cl.
*H04N 1/04* (2006.01)
*H04N 1/00* (2006.01)
*H04N 1/10* (2006.01)

(52) U.S. Cl.
CPC ......... *H04N 1/00018* (2013.01); *H04N 1/1017* (2013.01); *H04N 1/1026* (2013.01); *H04N 1/1043* (2013.01); *H04N 1/1065* (2013.01)

(58) Field of Classification Search
USPC ............ 358/497, 474, 496, 1.5, 488, 461, 1.9
See application file for complete search history.

(56) References Cited

U.S. PATENT DOCUMENTS

| 7,852,509 | B2 * | 12/2010 | Miyamoto | ...................... 358/1.5 |
| 2007/0081202 | A1 * | 4/2007 | Miyamoto | ..................... 358/496 |
| 2007/0121130 | A1 * | 5/2007 | Yoshida | .......................... 358/1.9 |
| 2007/0183003 | A1 * | 8/2007 | Bae | ................................ 358/474 |
| 2008/0055668 | A1 * | 3/2008 | Hirayama | ..................... 358/461 |
| 2010/0271671 | A1 * | 10/2010 | Shoda et al. | .................. 358/488 |
| 2014/0112673 | A1 * | 4/2014 | Sayama | ......................... 399/35 |

(Continued)

FOREIGN PATENT DOCUMENTS

| JP | 563-019965 A | 1/1988 |
| JP | 563-172376 A | 7/1988 |

(Continued)

OTHER PUBLICATIONS

An Office Action; "Notice of Reasons for Rejection," issued by the Japanese Patent Office on Sep. 24, 2014, which corresponds to Japanese Patent Application No. 2012-188292 and is related to U.S. Appl. No. 14/011,603.

*Primary Examiner* — Negussie Worku
(74) *Attorney, Agent, or Firm* — Studebaker & Brackett PC

(57) ABSTRACT

In an image reading device, a movable part provided below a document platen in a housing is moved in a sub scanning direction. A reflection control part extending along a movement range of the movable part is fixed to the housing near the movable part. The reflection control part has first reflection parts having a relatively large reflectance and second reflection parts having a relatively small reflectance arranged along the movement range. A detection light irradiation part provided in the movable part irradiates the reflection control part with detection light. A detection light reception part receives the detection light reflected by the reflection control part. A signal generating part generates a binary signal corresponding to the detection light received by the detection light reception part. A movement deciding part decides movement state of the movable part according to the binary signal generated by the signal generating part.

14 Claims, 4 Drawing Sheets

(56) References Cited

U.S. PATENT DOCUMENTS

| | | | |
|---|---|---|---|
| 2014/0211272 A1* | 7/2014 | Sayama | 358/475 |
| 2014/0227230 A1* | 8/2014 | Atarashi et al. | 424/93.6 |
| 2014/0240796 A1* | 8/2014 | Sayama | 358/475 |

FOREIGN PATENT DOCUMENTS

| | | |
|---|---|---|
| JP | S63-192761 U | 12/1988 |
| JP | S64-034061 A | 2/1989 |
| JP | H04-092557 A | 3/1992 |
| JP | H05-199375 A | 8/1993 |
| JP | 2004-214877 A | 7/2004 |
| JP | 2007-158859 A | 6/2007 |
| JP | 2008-124606 A | 5/2008 |

* cited by examiner

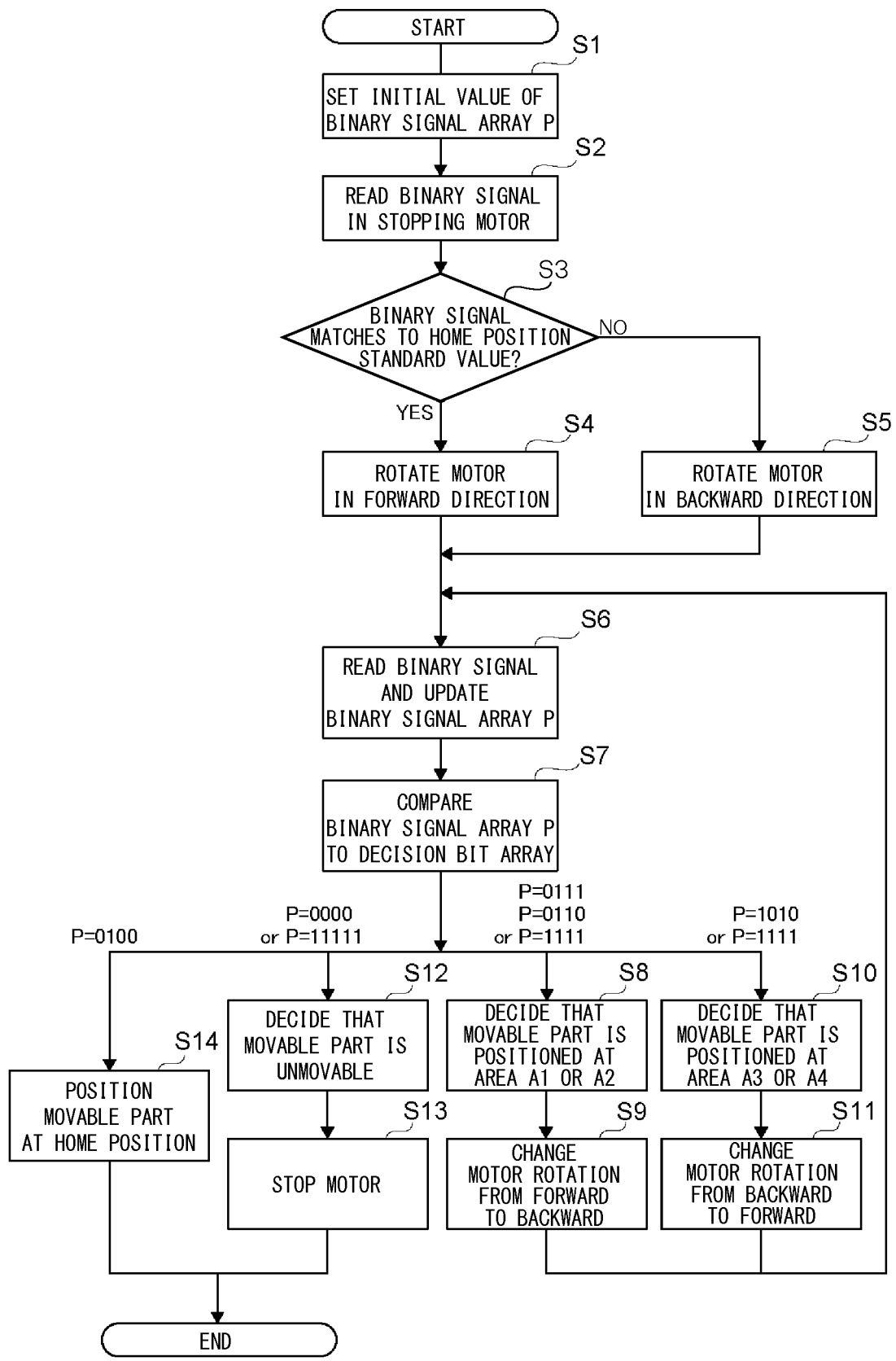

IMAGE READING DEVICE AND IMAGE FORMING APPARATUS

INCORPORATION BY REFERENCE

This application is based on and claims the benefit of priority from Japanese Patent application No. 2012-188292 filed on Aug. 29, 2012, the entire contents of which are incorporated herein by reference.

BACKGROUND

The present disclosure relates to an image reading device applied to a scanning device, copying machine, a multifunction peripheral or the like and configured to optically read a document, and an image forming apparatus.

Generally, an image reading device applied to a scanning device, copying machine, a multifunction peripheral or the like includes a document platen, a movable part, a motor and others. The document platen is made of a glass and formed in a rectangular flat board-like shape. The movable part is located below the document platen and configured to move in a direction (a sub scanning direction) along a long side of the document platen. The motor moves the movable part. The image reading device further includes a linear-formed light source and an imaging part. The linear-formed light source extends in another direction (a main scanning direction) along a short side of the document platen and configured to irradiate a document with scanning light. The imaging part receives the scanning light irradiated from the linear-formed light source and reflected by the document and generates image data corresponding to the received scanning light. The linear-formed light source is, for example, provided in the movable part and configured to irradiate the document placed on a top face of the document platen with the scanning light while moving in the sub scanning direction together with the movable part.

On the other hand, there are some image reading devices that include a lock sensor detecting whether or not the movable part is locked at a locking position by a locking mechanism. In such an image reading device, the lock sensor can detect an unmovable state of the movable part caused by locking it at the locking position by the locking mechanism. However, as a method of detecting the unmovable state of the movable part due to other cause, the image reading device generally applies a method of driving the motor for a predetermined time or more.

SUMMARY

In accordance with an embodiment of the present disclosure, an image reading device includes a housing, a document platen, a movable part, a drive source, a scanning light source, an imaging part, a reflection control part, a detection light irradiation part, a detection light reception part, a signal generating part and a movement deciding part. The document platen is fixed to an upper part of the housing and formed in a flat board-like shape by a material having optical transparency, and configured to have a top face on which a document is placed. The movable part is provided below the document platen in the housing, and configured so as to move in a sub scanning direction in parallel to the top face of the document platen. The drive source moves the movable part in a forward direction or a backward direction of the sub scanning direction. The scanning light source is provided in the movable part, and configured to irradiate the document placed on the document platen with scanning light. The imaging part optically reads the document by receiving the scanning light irradiated from the scanning light source and reflected by the document and generating image data corresponding to the document on the basis of the received scanning light. The reflection control part is fixed to the housing and located near the movable part, and configured to extend over the entire length of a movement range of the movable part. The reflection control part is also configured to have a plurality of first reflection parts having a relatively large reflectance and a plurality of second reflection parts having a relatively small reflectance arranged in a predetermined arrangement pattern over the entire length of the movement range of the movable part in a parallel direction to the sub scanning direction. The detection light irradiation part is provided in the movable part, and configured to irradiate the reflection control part with detection light. The detection light reception part receives the detection light irradiated from the detection light irradiation part and reflected by the reflection control part. The signal generating part generates a binary signal corresponding to the detection light received by the detection light reception part. The movement deciding part decides movement state of the movable part according to the binary signal generated by the signal generating part.

Furthermore, in accordance with an embodiment of the present disclosure, an image forming apparatus includes an image reading device optically reading a document and generating image data corresponding to the document. The image reading device includes a housing, a document platen, a movable part, a drive source, a scanning light source, an imaging part, a reflection control part, a detection light irradiation part, a detection light reception part, a signal generating part and a movement deciding part. The document platen is fixed to an upper part of the housing and formed in a flat board-like shape by a material having optical transparency, and configured to have a top face on which a document is placed. The movable part is provided below the document platen in the housing, and configured so as to move in a sub scanning direction in parallel to the top face of the document platen. The drive source moves the movable part in a forward direction or a backward direction of the sub scanning direction. The scanning light source is provided in the movable part, and configured to irradiate the document placed on the document platen with scanning light. The imaging part optically reads the document by receiving the scanning light irradiated from the scanning light source and reflected by the document and generating image data corresponding to the document on the basis of the received scanning light. The reflection control part is fixed to the housing and located near the movable part, and configured to extend over the entire length of a movement range of the movable part. The reflection control part is also configured to have a plurality of first reflection parts having a relatively large reflectance and a plurality of second reflection parts having a relatively small reflectance arranged in a predetermined arrangement pattern over the entire length of the movement range of the movable part in a parallel direction to the sub scanning direction. The detection light irradiation part is provided in the movable part, and configured to irradiate the reflection control part with detection light. The detection light reception part receives the detection light irradiated from the detection light irradiation part and reflected by the reflection control part. The signal generating part generates a binary signal corresponding to the detection light received by the detection light reception part. The movement deciding part decides movement state of the movable part according to the binary signal generated by the signal generating part.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 4 is a flowchart showing a movement detection controlling process of the movable part in the image reading device according to the embodiment of the present disclosure.

DETAILED DESCRIPTION

Figure 1:
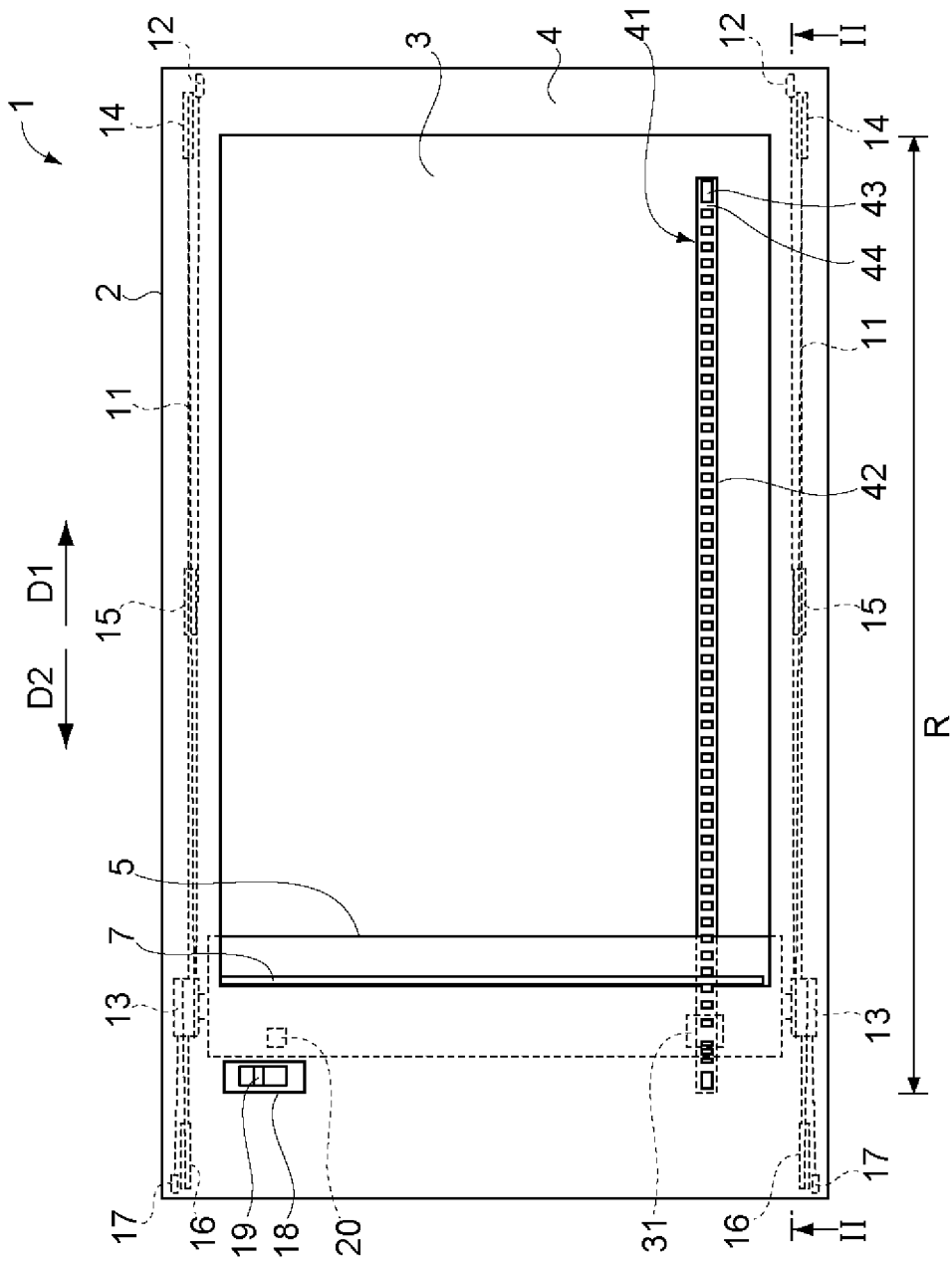
FIG. 1 is a top view schematically showing an image reading device according to an embodiment of the present disclosure.
Figure 2:
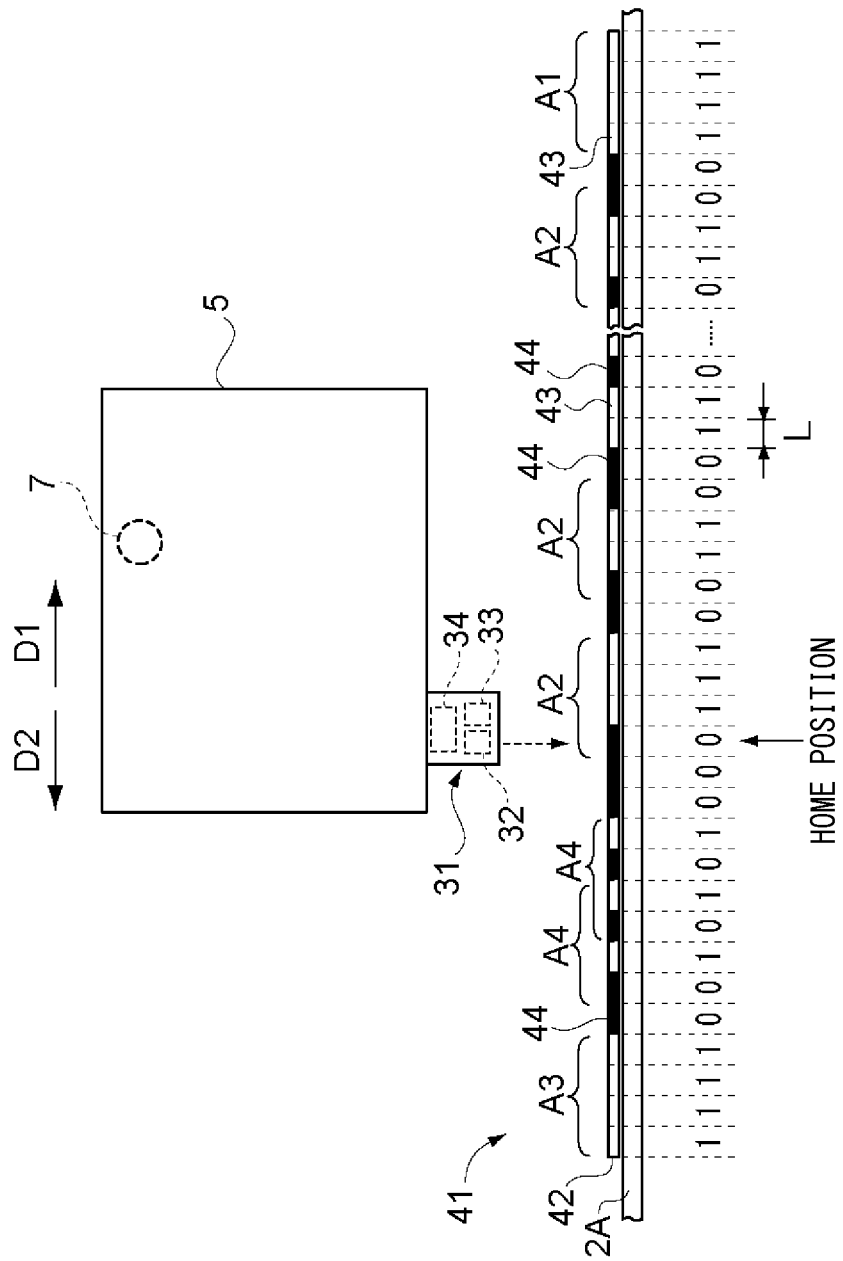
FIG. 2 is a schematic diagram showing a mechanism detecting movement of a movable part in the image reading device according to the embodiment of the present disclosure.

In the following, the embodiment of the present disclosure will be described with reference to the drawings. FIG. 1 shows an image reading device according to the embodiment of the disclosure in top view. FIG. 2 shows a movable part and a reflection controlling part in view of a direction indicated by arrows II-II in FIG. 1. FIG. 2 moreover illustrates a correspondence relationship between an arrangement of strong reflection parts and weak reflection parts formed in the reflection controlling part, and an arrangement of binary signals.

As shown in FIG. 1, the image reading device 1 according to the embodiment of the disclosure is a device adapted to optically read a document and to generate image data corresponding to the document. The image reading device 1 is installed, for example, in a scanning device, copying machine, a multifunction peripheral or the like.

The image reading device 1 includes a rectangular parallelepiped box-formed housing 2. To an upper part of the housing 2, a document platen 3 and a frame body 4 are fixed. The document platen 3 is made of a material, such as a glass or the like, having optical transparency and formed in a rectangular flat board-like shape in planar view. The document to be read by the image reading device 1 is placed on a top face of the document platen 3. The frame body 4 is located so as to surround the document platen 3.

In the housing 2, the movable part 5 is installed below the document platen 3. The movable part 5 is formed in a roughly rectangular parallelepiped shape to extend in a direction (a main scanning direction) along a short side of the document platen 3. Both ends of the movable part 5 are movably supported near side walls of the housing 2.

The movable part 5 is configured so as to move in a parallel direction to the top face of the document platen 3 and a direction (a sub scanning direction) along a long side of the document platen 3. Concretely, the movable part 5 receives power of motor 6 (not shown in FIG. 1, but referred to FIG. 3) as a drive source to move in a forward direction or a backward direction of the sub scanning direction. In FIG. 1, an arrow D1 indicates the forward direction and another arrow D2 indicates the backward direction. The movable part 5 can be moved between a position corresponding to one end part (a left end part in FIG. 1) in the long side direction of the document platen 3 and another position corresponding to another end part (a right end part in FIG. 1) in the long side direction of the document platen 3. An arrow R in FIG. 1 indicates a movement range of the movable part 5. FIG. 1 illustrates a condition where the movable part 5 is positioned at a home position.

In the housing 2, a pair of movement mechanisms moving the movable part 5 in the sub scanning direction by the power of the motor 6 are provided. Each movement mechanism may apply a commonly used configuration. For example, the movement mechanism includes a wire 11, a wire fixing part 12, twin pulleys 13, a plurality of following pulleys 14 and 16, a driving pulley 15 and another wire fixing part 17. The wire fixing part 12 fixes one end part of the wire 11 to the housing 2 side. The twin pulleys 13 are attached to an end part of the movable part 5. The plurality of following pulleys 14 and 16 are located to the housing 2 side. The driving pulley 15 is also located to the housing 2 side. The other wire fixing part 17 fixes another end part of the wire 11 to the housing 2 side. The one end part of the wire 11 is fixed to the wire fixing part 12 at a right side in FIG. 1. The other end part of the wire 11 is run around an inside pulley of the twin pulleys 13, the following pulley 14 at the right side in FIG. 1, driving pulley 15, following pulley 16 at a left side in FIG. 1 and an outside pulley of the twin pulleys 13 in order, and then, fixed to the other wire fixing part 17 at the left side in FIG. 1. Between the driving pulley 15 and motor 6, a power transmission mechanism (not shown) transmitting the power of the motor 6 to the drive pulley 16 and including a belt gear and others is provided.

In addition, in the movable part 5, a scanning light source 7 is provided. The scanning light source 7 is a linear-formed light source extending in the main scanning direction and radiates scanning light used for optically reading the document. With the scanning light, the document placed on the top face of the document platen 3 is irradiated. The scanning light source 7 is moved in the sub scanning direction together with the movable part 5 while radiating the scanning light, and thereby, the scanning of the document is carried out.

Below the movable part 5 in the housing 2, an imaging part 8 (not shown in FIG. 1, but referred to FIG. 3) is provided. The imaging part 8 receives the scanning light irradiated from the scanning light source 7 and reflected by the document and generates image data corresponding to the document on the basis of the received scanning light. The imaging part 8 includes an image sensor installing, for example, a CCD (Charge Coupled Device). Moreover, in the movable part 5, a plurality of mirrors are provided and these mirrors form an optical path of the scanning light. In the middle of the optical path, a lens is provided, and then, an image based on the scanning light is formed on a light reception face of the imaging part 8 by the lens.

In addition, in the upper part (a left upper side in FIG. 1) of the housing 2, a locking mechanism 18 is provided. The locking mechanism 18 is a mechanism preventing movement of the movable part 5 caused by exterior vibration or inclination of an entire device when the image reading device 1 is transported (in a case where the image reading device 1 is installed in the multifunction peripheral or the like, when the multifunction peripheral or the like is transported). The locking mechanism 18 includes a lock switch 19 located to the housing 2 side, an engaging protrusion (not shown) located to the housing 2 side and an engaged hole 20 formed to a movable part 5 side. If an instruction to lock the movable part 5 is inputted to the image reading device 1 by a user, the motor 6 is driven to move the movable part 5 to a locking position. The locking position is a position where the engaged hole 20 of the movable part 5 is positioned just under the lock switch 19, i.e., in the embodiment, at one side (the left side in FIG. 1) from the home position in the movement range of the movable part 5. When the engaged hole 20 of the movable part 5 is positioned just under the lock switch 19, the engaging protrusion is positioned so as to correspond to the engaged hole 20. In such a condition, if the user operates the lock switch 19, the engaging protrusion advances to the engaged hole 20, and then, a top end part of the engaging protrusion inserts in the engaged hole 20. Thereby, the movable part 5 is fixed (locked) at the locking position.

Moreover, the image reading device 1 includes a movement detection mechanism detecting the movement of the movable part 5. The movement detection mechanism includes a light sensor unit 31 and a reflection control part 41.

The reflection control part 41 is, as shown in FIG. 2, located near the movable part 5 and below the movable part 5. The reflection control part 41 extends, as shown in FIG. 1, over roughly the entire length of the movement range (R) of the movable part 5. The reflection control part 41 is configured by affixing a filter element 42 to a bottom board 2A of the housing 2. The filter element 42 is a long-sized thin board having roughly same length as the entire length of the movement range (R) of the movable part 5 and has a surface with a smaller light reflectance. In the filter element 42, a plurality of holes are formed. Parts having these formed holes expose a surface of the bottom board 2A of the housing 2. The surface of the bottom board 2A of the housing 2 has a larger reflectance than the surface of the filter element 42.

As shown in FIG. 2, the parts having the formed holes (slits) in the filter element 42 are strong reflection parts (first reflection parts) 43 and other parts without the holes in the filter element 42 are weak reflection parts (second reflection parts) 44. The strong reflection part 43 has a larger reflectance than the weak reflection part 44. The strong reflection part 43 and weak reflection part 44 have predetermined unit length. An arrow L in FIG. 2 indicates this unit length. A plurality of the strong reflection parts 43 and a plurality of the weak reflection parts 44 are arranged in a line in a predetermined arrangement pattern over the entire length of the movement range (R) of the movable part 5 in a parallel direction to the sub scanning direction.

The light sensor unit 31 is, as shown in FIG. 2, fixed to a lower face side of the movable part 5 and located at a position facing to the reflection control part 41. The light sensor unit 31 includes a detection light irradiation part 32, a detection light reception part 33 and a signal generating part 34. The detection light irradiation part 32 is, for example, a light emitting element to irradiate the reflection control part 41 with detection light. The detection light reception part 33 is, for example, a light receiving element to receive the detection light irradiated from the detection light irradiation part 32 and reflected by the reflection control part 41. The signal generating part 34 generates a binary signal having voltage according to intensity of the detection light received by the detection light reception part 33. Concretely, when the detection light is reflected by the strong reflection part 43 and received by the detection light reception part 33, the signal generating part 34 generates the binary signal having high level voltage. On the other hand, when the detection light is reflected by the weak reflection part 44 and received by the detection light reception part 33, the signal generating part 34 generates the binary signal having low level voltage. Hereinafter, with regard to the binary signal, a value "1" indicates that the binary signal is a high level and another value "0" indicates that the binary signal is a low level.

During the movable part 5 is moving in the forward direction, whenever the movable part 5 is moved by a distance corresponding to the unit length (L) in the forward direction, the signal generating part 34 generates the binary signal according to the detection signal received by the detection light reception part 33 at that moment. Similarly, during the movable part 5 is moving in the backward direction, whenever the movable part 5 is moved by the distance corresponding to the unit length (L) in the backward direction, the signal generating part 34 generates the binary signal according to the detection signal received by the detection light reception part 33 at that moment.

In the reflection control part 41, the arrangement pattern of the plurality of the strong reflection parts 43 and the plurality of the weak reflection parts 44 are determined so as to satisfy the following conditions.

As a first condition, when the movable part 5 is positioned at the home position, the strong reflection part 43 or weak reflection part 44 is positioned at a position corresponding to the home position so that the generated binary signal becomes a home position standard value. In the embodiment, because the home position standard value is "0", the weak reflection part 44 is positioned at the position corresponding to the home position.

As a second condition, in an end part at the forward direction side in the movement range (R) of the movable part 5, an area A1 (a detection area of a forward direction termination) is determined. In the embodiment, four strong reflection parts 43 are continuously located in the area A1 so that an array of sequentially generated binary signals becomes "1111" when the movable part 5 is moved through the area A1 in the forward direction. The area A1 (the detection area of the forward direction termination) is a kind of detection areas of forward direction positions, i.e. a particular state as the detection area of the forward direction position.

As a third condition, in areas except for the area A1 at the forward direction side (the right side in FIG. 1) from the home position in the movement range (R) of the movable part 5, one or more areas A2 (the detection areas of the forward direction positions) are determined. In each area A2, four reflection parts in total of the strong reflection parts 43 and weak reflection parts 44 are located. The arrangement pattern in the forward direction of the strong reflection parts 43 and weak reflection parts 44 are determined so that an array of sequentially generated binary signals becomes a characteristic array ("0111" or "0110" in the embodiment) when the movable part 5 is moved through the area A2 in the forward direction.

As a fourth condition, in an end part at the backward direction side in the movement range (R) of the movable part 5, an area A3 (a detection area of a backward direction termination) is determined. In the embodiment, four strong reflection parts 43 are continuously located in the area A3 so that an array of sequentially generated binary signals becomes "1111" when the movable part 5 is moved through the area A3 in the backward direction. The area A3 (the detection area of the backward direction termination) is a kind of detection areas of backward direction positions, i.e. a particular state as the detection area of the backward direction position.

As a fifth condition, in areas except for the area A3 at the backward direction side (the left side in FIG. 1) from the home position in the movement range (R) of the movable part 5, one or more areas A4 (the detection areas of the backward direction positions) are determined. In each area A4, four reflection parts in total of the strong reflection parts 43 and weak reflection parts 44 are located. The arrangement pattern in the forward direction of the strong reflection parts 43 and weak reflection parts 44 are determined so that an array of sequentially generated binary signals becomes a characteristic array ("1010" in the embodiment) when the movable part 5 is moved through the area A4 in the backward direction.

As a sixth condition, in the areas except for the areas A1 to A4, the arrangement pattern of the strong reflection parts 43 and weak reflection parts 44 are determined as follows. That is, an array of sequentially generated binary signals is becomes a different array from the arrays determined in the above-mentioned second condition and third condition, e.g. the arrays of "0111", "0110" and "1111", when the movable part 5 is moved in the forward direction. In addition, another array of the sequentially generated binary signals becomes a different array from the arrays determined in the above-mentioned fourth condition and fifth condition, e.g. the arrays of "1010" and "1111", when the movable part 5 is moved in the backward direction.

As a seventh condition, the arrangement pattern is determined so that the binary signals indicating the value "1" are not generated for five times or more continuously when the movable part 5 is moved in the sub scanning direction. That is, five or more strong reflection parts 43 are not located continuously.

As an eighth condition, the arrangement pattern is determined so that the binary signals indicating the value "0" are not generated for four times or more continuously when the movable part 5 is moved in the sub scanning direction. That is, four or more weak reflection parts 44 are not located continuously.

Figure 3:
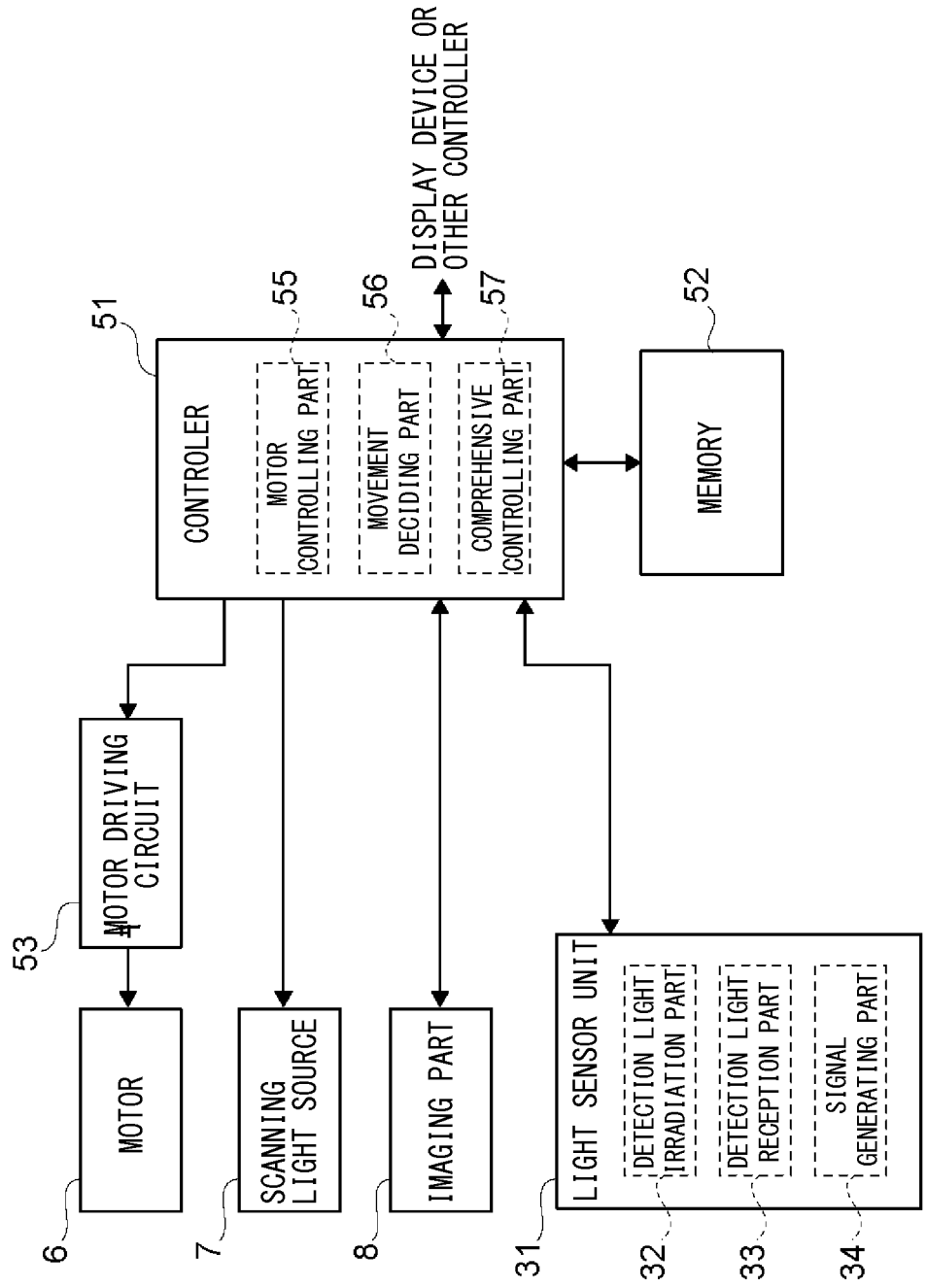
FIG. 3 is a block diagram schematically showing an electrical configuration of the image reading device according to the embodiment of the present disclosure.

FIG. 3 illustrates an electrical configuration of the image reading device 1. As shown in FIG. 3, the image reading device 1 includes a controller 51 and a memory 52. The controller 51 includes, for example, a CPU (Central Processing Unit) or a combination of the CPU and an ASIC (Application Specific Integrated Circuit). The controller 51 and memory 52 are connected to each other. In addition, to the controller 51, the motor 6 is connected via a motor driving circuit 53. Moreover, to the controller 51, the scanning light source 7, imaging part 8 and light sensor unit 31 are connected. Further, the controller 51 works as a motor controlling part (a drive controlling part) 55, a movement deciding part 56 and a comprehensive controlling part 57 by reading and executing computer programs stored in the memory 52. The motor controlling part 55 controls the motor 6 via the motor driving circuit 53. The movement deciding part 56 decides movement state of the movable part 5. The comprehensive controlling part 57 carries out and controls reading process of the document and other processes.

In the image reading device 1, after the power is supplied and predetermined initial preparation operation is completed, the movable part 5 waits, for example, at the home position positioning at one end side (a side where the document scanning is started) in the sub scanning direction of the document platen 3. In addition, after the document scanning is normally completed, the movable part 5 is moved to the home position.

On the other hand, when the movable part 5 cannot be moved to the home position, the image reading device 1 warns in order to inform the user of that effect. For example, if the movable part 5 is locked at the locking position by the locking mechanism 18, the movable part 5 cannot be moved to the home position. If the movable part 5 is positioned at a different position from the locking position but the locking mechanism 18 is set in a lock-on state, the movable part 5 often comes into contact with the locking mechanism 18 and cannot be moved to the home position. If any foreign matter exists in the middle of the movement area of the movable part 5, the movable part 5 often comes into contact with the foreign matter and cannot be moved to the home position. In any of such cases, the image reading device 1 detects that effect and displays, for example, warning message on a display provided in the scanning device or multifunction peripheral.

In the image reading device 1 having the above-mentioned configuration, when the document placed on the document platen 3 is read, the motor 6 is driven to move the movable part 5 from one end to another end (from the left side to the right side in FIG. 1) in the sub scanning direction according to the document reading range. During the movable part 5 is moving, the scanning light source 7 irradiates the document with the scanning light, the imaging part 8 receives the scanning light reflected by the document and the imaging part 8 generates the image data corresponding to the scanning light. In a case where the document scanning is completed or other cases, when the movable part 5 is moved to the home position, the image reading device 1 carries out the below-mentioned movement detection controlling process.

FIG. 4 illustrates the movement detection controlling process in the image reading device 1. When the movable part 5 is moved to the home position, the controller 51 starts the movement detection controlling process. In FIG. 4, first, the movement deciding part 56 of the controller 51 secures four bits of a storing area in the memory 52 and sets (stores) an initial value of four bits of a binary signal array P in the storing area (step S1). The initial value of the binary signal array P is, for example, "0100".

Next, the movement deciding part 56 confirms whether or not the motor 6 is stopped. When the motor 6 is not stopped, the motor controlling part 55 controls the motor 6 to stop, and then, the movement deciding part 56 reads the binary signal (step S2). Concretely, the detection light irradiation part 32 irradiates the reflection control part 41 with the detection light and the detection light reception part 33 receives the detection light reflected by the reflection control part 41. Then, the signal generating part 34 generates the binary signal according to the received detection signal and the movement deciding part 56 reads the generated binary signal. Thereby, the movement deciding part 56 can acquire the binary signal corresponding to the present position of the movable part 5 during stopping.

Subsequently, the movement deciding part 56 decides whether or not the binary signal read in step S2 matches to the home position standard value (the value "0" in the embodiment) (step S3). When the binary signal read in step S2 matches to the home position standard value (step S3: YES), the motor controlling part 55 of the controller 51 controls the motor 6 to rotate in a forward direction (step S4). Thereby, the movable part 5 starts to move in the forward direction. On the other hand, when the binary signal read in step S2 does not match to the home position standard value (step S3: NO), the motor controlling part 55 of the controller 51 controls the motor 6 to rotate in a backward direction (step S5). Thereby, the movable part 5 starts to move in the backward direction.

After that, the movement deciding part 56 reads the binary signal at the timing when the movable part 5 is moved by the distance corresponding to the unit length (L) and updates the binary signal array P by using the read binary signal (step S6). The update of the binary signal array P is carried out so that four bits of the binary signal array P is shifted to the left by one bit, an overflowed most significant bit (an overflowed leftmost bit) is truncated and the binary signal read by step S6 is set to a least significant bit (a rightmost bit). For example, when the binary signal array P before updating is "0100" and the binary signal read by step S6 is "1", the updated binary signal array P becomes "1001".

Next, the movement deciding part 56 compares the updated binary signal array P with a decision bit array (step S7). In the memory 52, a plurality of patterns of the decision bit arrays are stored in advance. In the embodiment, the decision bit arrays includes "0111", "0110", "1010", "1111", "0000" and "0100". The movement deciding part 56 reads the decision bit arrays and compares the updated binary signal array P with the read decision bit arrays, for example, in sequence.

When the motor 6 rotates in the forward direction, if the updated binary signal array P matches to the decision bit array of "0111" or "0110", the movement deciding part 56 decides that the movable part 5 is positioned at the area A2 at present (step S8). In such a case, the motor controlling part 55 changes the rotation direction of the motor 6 from the forward direction to the backward direction (step S9). Thereby, the movement direction of the movable part 5 is inverted from the forward direction to the backward direction. Subsequently, the process is returned to step S6.

When the motor 6 rotates in the forward direction, if the updated binary signal array P matches to the decision bit array of "1111", the movement deciding part 56 further decides whether or not the binary signal array P before updating matches to the decision bit array of "1111" (for example, it checks a below-mentioned history flag stored in the memory 52). As a result, if the binary signal array P before updating does not match to the decision bit array of "1111", the movement deciding part 56 decides that the movable part 5 is positioned at the area A1 at present (step S8). In such a case, the motor controlling part 55 changes the rotation direction of the motor 6 from the forward direction to the backward direction (step S9). Thereby, the movement direction of the movable part 5 is inverted from the forward direction to the backward direction. After that, the matching of the updated binary signal array P to the decision bit array of "1111" is stored in the memory 52, for example, by using the history flag or the like. Subsequently, the process is returned to step S6.

When the motor 6 rotates in the backward direction, if the updated binary signal array P matches to the decision bit array of "1010", the movement deciding part 56 decides that the movable part 5 is positioned at the area A4 at present (step S10). In such a case, the motor controlling part 55 changes the rotation direction of the motor 6 from the backward direction to the forward direction (step S11). Thereby, the movement direction of the movable part 5 is inverted from the backward direction to the forward direction. Subsequently, the process is returned to step S6.

When the motor 6 rotates in the backward direction, if the updated binary signal array P matches to the decision bit array of "1111", the movement deciding part 56 further decides whether or not the binary signal array P before updating matches to the decision bit array of "1111" (for example, it checks the history flag stored in the memory 52). As a result, if the binary signal array P before updating does not match to the decision bit array of "1111", the movement deciding part 56 decides that the movable part 5 is positioned at the area A3 at present (step S10). In such a case, the motor controlling part 55 changes the rotation direction of the motor 6 from the backward direction to the forward direction (step S11). Thereby, the movement direction of the movable part 5 is inverted from the backward direction to the forward direction. After that, the matching of the updated binary signal array P to the decision bit array of "1111" is stored in the memory 52, for example, by using the history flag or the like. Subsequently, the process is returned to step S6.

As mentioned above, when the motor 6 rotates in the forward direction or backward direction and the updated binary signal array P matches to the decision bit array of "1111", the movement deciding part 56 decides whether or not the binary signal array P before updating matches to the decision bit array of "1111". As a result, if the binary signal array P before updating matches to the decision bit array of "1111", the movement deciding part 56 decides that the movable part 5 is unmovable at present (step S12). That is, a condition where both the binary signal array P before updating and the updated binary signal array P match to the decision bit array of "1111" means that the binary signals indicating the value "1" are generated for five times continuously. In such a case, it is considered that the movable part 5 becomes unmovable at a position where the one strong reflection part 43 is located. Therefore, in this case, the movement deciding part 56 decides that the movable part 5 is unmovable. In the case, the motor controlling part 55 controls the motor to stop (step S13). Subsequently, as necessary, a process of displaying a message notifying that the movable part 5 cannot be moved to the home position is carried out. For example, if the image reading device 1 is provided with the display, the message is outputted to the display. On the other hand, if the image reading device 1 is installed in the multifunction peripheral, a command to display the above-mentioned message on the display located to the multifunction peripheral is outputted to a controller of the multifunction peripheral by the controller 51. After that, the movement detection controlling process is finished.

When the motor 6 rotates in the forward direction or backward direction, if the updated binary signal array P matches to the decision bit array of "0000", the movement deciding part 56 decides that the movable part 5 is unmovable at present (step S12). That is, a condition where the updated binary signal array P matches to the decision bit array of "0000" means that the binary signals indicating the value "0" are generated for four times continuously. In such a case, it is considered that the movable part 5 becomes unmovable at a position where the one weak reflection part 44 is located. Therefore, in this case, the movement deciding part 56 decides that the movable part 5 is unmovable. Then, the motor controlling part 55 controls the motor to stop (step S13). Subsequently, as necessary, the process of displaying the message notifying that the movable part 5 cannot be moved to the home position is carried out. After that, the movement detection controlling process is finished.

When the motor 6 rotates in the forward direction, if the updated binary signal array P matches to the decision bit array of "0100", the motor controlling part 55 controls the movable part 5 to move by the distance corresponding to the unit length (L) in the forward direction from the present position, and then, controls the motor to stop. Thereby, the movable part 5 is positioned at the home position (step S14). Subsequently, the movement detection controlling process is finished.

In the image reading device 1, as a method of detecting that the movable part 5 cannot be moved to the home position, if another different method from the present disclosure were applied, the following problems would be caused. For example, as the other different method from the disclosure, there is a method of continuing to drive the motor for a predetermined time or more in order to move the movable part to the home position and detecting that the movable part cannot be moved to the home position if the movable part does not yet reach the home position.

The predetermined time is a time required for moving the movable part to the home position from a position where the movable part is positioned at the farthest position from the home position in the movement range. Concretely, because the home position is positioned at roughly one end part in the movement range, the above-mentioned predetermined time is a time required for moving the movable part to roughly the one end part from another end part in the movement range, that is, a time required for moving the movable part for roughly the entire length of the movement range.

Alternatively, as the other different method from the disclosure, there is another method of continuing to drive the motor over the time required for moving the movable part for roughly the entire length of the movement range.

As the problem caused when the other different method from the disclosure is applied, a long period is often needed in order to move the movable part for roughly the entire length of the movement range. Therefore, if the movable part is unmovable due to the above-mentioned cause, a state that the motor is driven but the movable part cannot be moved continues for the long time. As a result, to the power transmission mechanism of transmitting the power of the motor to the movable part, excessive load may be applied and large vibration may be occurred. The excessive load applied to the power transmission mechanism causes acceleration of degradation of the power transmission mechanism (e.g. tooth breakage of the belt gear). The occurrence of the large vibration causes a gap in the optical path leading the scanning light to the imaging part.

If the power of the image reading device is turned off during the document is scanned or during the movable part is returned to the home position after the document scanning, the movable part is stopped at an unexpected position. In such a condition, if the power of the image reading device is turned on, the image reading device attempts to move the movable part stopping at the unexpected position to the home position. In such a case, because the image reading device cannot recognize a position of the movable part stopping at the unexpected position, the movement of the movable part to the home position cannot be achieved by a short stroke and arrival of the movable part to the home position often takes much time.

However, as described above, in accordance with the image reading device 1 according to the embodiment of the present disclosure, it is possible to recognize the movement state of the movable part 5 and to swiftly control inversion and stop of the rotation direction of the motor 6 according to the recognized movement state of the movable part 5. In addition, it is possible to suitably carry out the inversion of the movement direction and positioning to the home position of the movable part 5.

That is, according to the present disclosure, regardless of unmovable state of the movable part 5, it is possible to prevent long time drive of the motor for moving the movable part. Moreover, it is possible to achieve the movement of the movable part to the home position by a short time after the movable part stopped at the unexpected position.

Particularly, in accordance with the image reading device 1 according to the embodiment of the present disclosure, it is possible to recognize that the movable part 5 is unmovable, and then, to stop the motor 6. Concretely, there are the following unmovable cases. For example, in one case, the movable part 5 is locked at the locking position by the locking mechanism 18. In another case, regardless of the movable part 5 at a position of except for the locking position, the lock switch 19 of the locking mechanism 18 is turned on so that the engaging protrusion advances, and therefore, the movable part 5 cannot be moved because of coming into contact with the engaging protrusion. In a further case, the movable part 5 cannot be moved because of coming into contact with the foreign matter. Even in the above-mentioned cases, it is possible to surely recognize the unmovable state of the movable part 5, and then, to immediately stop the motor 6. Thereby, it is possible to restrain the excessive load from applying to the power transmission mechanism of transmitting the rotation power of the motor 6 to the movable part 5. Moreover, it is possible to restrain the occurrence of the large vibration. For example, it is possible to restrain the tooth breakage of the belt gear as a member constituting the power transmission mechanism and to prolong a life of the belt gear.

In addition, in accordance with the image reading device 1 according to the embodiment of the present disclosure, it is possible to recognize the position of the movable part 5, and then, to invert the movement direction of the movable part 5 so that the movable part 5 early approaches the home position. Thereby, it is possible to achieve the movement of the movable part 5 to the home position by a short stroke and to achieve the movement of the movable part 5 to the home position by a short time.

Although, in the above-mentioned embodiment, a case of forming the reflection control part 41 by using the filter element 42 having the plurality of holes is illustrated as an instance, the present disclosure is not restricted by this case. The reflection control part 41 may be formed by applying the housing 2 in which the surface of the bottom board 2A has a smaller reflectance and affixing a member having a larger reflectance to the surface of the bottom board 2A. Alternatively, the reflection control part 41 may be formed by arranging members as a small piece having the unit length (L) on the bottom board 2A of the housing 2.

An arrangement order of the strong reflection parts 43 and weak reflection parts 44 and determination states of the areas A1 to A4 are not restricted by a case of the above-mentioned embodiment. If the unmovable state of the movable part 5 and the position of the movable part 5 to be inverted can be detected, the strong reflection parts 43 and weak reflection parts 44 may be arranged in different order from the embodiment, the number of the areas A1 to A4 may be increased or decreased and the areas A1 to A4 may be determined at different positions from the embodiment. Although, in the embodiment, parts having a smaller reflectance than the strong reflection part 43 are used as the weak reflection parts 44, in another embodiment, parts where the light is not reflected may be used as the weak reflection parts 44.

Although, in the above-mentioned embodiment, in a case illustrated as an instance, the detection of the position of the movable part 5 to be inverted, the detection of the unmovable state of the movable part 5 and the positioning of the movable part 5 to the home position are achieved by detecting the arrangement pattern of the strong reflection parts 43 and weak reflection parts 44 by the light sensor unit, the present disclosure is not restricted by this case. In another case, the detection of the position of the movable part 5 to be inverted and the detection of the unmovable state of the movable part 5 may be achieved by detecting the arrangement pattern of the strong reflection parts 43 and weak reflection parts 44 by the light sensor unit. In the other case, the positioning of the movable part 5 to the home position may be achieved by making a separately provided sensor detect whether or not the movable part 5 is positioned at the home position. Alternatively, in a further case, the detection of the unmovable state of the movable part 5 may be achieved by detecting the arrangement pattern of the strong reflection parts 43 and weak reflection parts 44 by the light sensor unit. In the further case, the movement inversion of the movable part 5 may be achieved by making a separately provided sensor detect whether or not the movable part 5 reaches each end part in the movement range.

The present disclosure can be suitably changed within the summary or idea of the disclosure solved from the claims and specification and a technical idea of the present disclosure includes an image reading device with such a change.

While the present disclosure has been described with reference to the preferable embodiment of the image forming apparatus of the disclosure and the description has technical preferable illustration, the disclosure is not to be restricted by the embodiment and illustration. Components in the embodiment of the present disclosure may be suitably changed or modified, or variously combined with other components. The claims are not restricted by the description of the embodiment.

What is claimed is:

1. An image reading device comprising:
   a housing;
   a document platen fixed to an upper part of the housing and formed in a flat board-like shape by a material having optical transparency, and configured to have a top face on which a document is placed;
   a movable part provided below the document platen in the housing, and configured so as to move in a sub scanning direction in parallel to the top face of the document platen;
   a drive source moving the movable part in a forward direction or a backward direction of the sub scanning direction;
   a scanning light source provided in the movable part, and configured to irradiate the document placed on the document platen with scanning light;
   an imaging part optically reading the document by receiving the scanning light irradiated from the scanning light source and reflected by the document and generating image data corresponding to the document on the basis of the received scanning light;
   a reflection control part fixed to the housing and located near the movable part, and configured to extend over the entire length of a movement range of the movable part and to have a plurality of first reflection parts and a plurality of second reflection parts arranged in a predetermined arrangement pattern over the entire length of the movement range of the movable part in a parallel direction to the sub scanning direction, the second reflection part having a reflectance smaller than that of the first reflection part;
   a detection light irradiation part provided in the movable part, and configured to irradiate the reflection control part with detection light;
   a detection light reception part receiving the detection light irradiated from the detection light irradiation part and reflected by the reflection control part;
   a signal generating part generating a binary signal corresponding to the detection light received by the detection light reception part; and
   a movement deciding part deciding movement state of the movable part according to the binary signal generated by the signal generating part.

2. The image reading device according to claim 1, wherein the movement deciding part decides that the movable part is a unmovable state when the signal generating part generates the binary signals indicating same value for a predetermined times or more continuously.

3. The image reading device according to claim 1, wherein the reflection control part has a detection area of a forward direction position and a detection area of a backward direction position,
   an arrangement pattern in the forward direction of a predetermined number of the first reflection parts and second reflection parts arranged in the detection area of the forward direction position is a characteristic arrangement pattern different from an arrangement pattern in the forward direction of the predetermined number of the first reflection parts and second reflection parts arranged in an area except for the detection area of the forward direction position, and an arrangement pattern in the backward direction of a predetermined number of the first reflection parts and second reflection parts arranged in the detection area of the backward direction position is a characteristic arrangement pattern different from an arrangement pattern in the backward direction of the predetermined number of the first reflection parts and second reflection parts arranged in an area except for the detection area of the backward direction position, and
   the movement deciding part decides a position of the movable part on the basis of the binary signals corresponding to the characteristic arrangement pattern in the forward direction in the detection area of the forward direction position when the movable part is moved in the forward direction, and decides a position of the movable part on the basis of the binary signals corresponding to the characteristic arrangement pattern in the backward direction in the detection area of the backward direction position when the movable part is moved in the backward direction.

4. The image reading device according to claim 3 further comprising
   a drive controlling part controlling the drive source, wherein
   the detection area of the backward direction position is located at one end side of the movement range of the movable part, and the detection area of the forward direction position is located at another end side of the movement range of the movable part,
   the movement deciding part decides arrival of the movable part at the one end side of the movement range on the basis of the binary signals corresponding to the characteristic arrangement pattern in the backward direction in the detection area of the backward direction position when the movable part is moved in the backward direction, and decides arrival of the movable part at the other end side of the movement range on the basis of the binary signals corresponding to the characteristic arrangement pattern in the forward direction in the detection area of the forward direction position when the movable part is moved in the forward direction, and
   the drive controlling part controls the drive source to change movement direction of the movable part from the backward direction to the forward direction when the decision result of the movement deciding part indicates the arrival of the movable part at the one end side of the movement range, and controls the drive source to change movement direction of the movable part from the forward direction to the backward direction when the decision result indicates the arrival of the movable part at the other end side of the movement range.

5. The image reading device according to claim 1, wherein the reflection control part includes a long-sized member in which a plurality of slits or holes are formed, and, in the member, each part with the formed slit or hole acts as one of the first reflection part and second reflection part, and each part without the formed slit or hole acts as another of the first reflection part and second reflection part.

6. The image reading device according to claim 1, wherein the reflection control part is constituted of a member having a smaller reflectance than a bottom board of the housing and including the first reflection parts and second reflection parts.

7. The image reading device according to claim 1, wherein
the reflection control part has the first reflection parts and second reflection parts arranged in an arrangement pattern so that the binary signals generated by the signal generating part becomes a home position standard value when the movable part is positioned at a home position.

8. An image forming apparatus comprising:
an image reading device optically reading a document and generating image data corresponding to the document, wherein the image reading device includes:
   a housing;
   a document platen fixed to an upper part of the housing and formed in a flat board-like shape by a material having optical transparency, and configured to have a top face on which a document is placed;
   a movable part provided below the document platen in the housing, and configured so as to move in a sub scanning direction in parallel to the top face of the document platen;
   a drive source moving the movable part in a forward direction or a backward direction of the sub scanning direction;
   a scanning light source provided in the movable part, and configured to irradiate the document placed on the document platen with scanning light;
   an imaging part optically reading the document by receiving the scanning light irradiated from the scanning light source and reflected by the document and generating image data corresponding to the document on the basis of the received scanning light;
   a reflection control part fixed to the housing and located near the movable part, and configured to extend over the entire length of a movement range of the movable part and to have a plurality of first reflection parts and a plurality of second reflection parts arranged in a predetermined arrangement pattern over the entire length of the movement range of the movable part in a parallel direction to the sub scanning direction, the second reflection part having a reflectance smaller than that of the first reflection part;
a detection light irradiation part provided in the movable part, and configured to irradiate the reflection control part with detection light;
a detection light reception part receiving the detection light irradiated from the detection light irradiation part and reflected by the reflection control part;
a signal generating part generating a binary signal corresponding to the detection light received by the detection light reception part; and
a movement deciding part deciding movement state of the movable part according to the binary signal generated by the signal generating part.

9. The image forming apparatus according to claim 8, wherein
the movement deciding part decides that the movable part is a unmovable state when the signal generating part generates the binary signals indicating same value for a predetermined times or more continuously.

10. The image forming apparatus according to claim 8, wherein
the reflection control part has a detection area of a forward direction position and a detection area of a backward direction position,
an arrangement pattern in the forward direction of a predetermined number of the first reflection parts and second reflection parts arranged in the detection area of the forward direction position is a characteristic arrangement pattern different from an arrangement pattern in the forward direction of the predetermined number of the first reflection parts and second reflection parts arranged in an area except for the detection area of the forward direction position, and an arrangement pattern in the backward direction of a predetermined number of the first reflection parts and second reflection parts arranged in the detection area of the backward direction position is a characteristic arrangement pattern different from an arrangement pattern in the backward direction of the predetermined number of the first reflection parts and second reflection parts arranged in an area except for the detection area of the backward direction position, and
the movement deciding part decides a position of the movable part on the basis of the binary signals corresponding to the characteristic arrangement pattern in the forward direction in the detection area of the forward direction position when the movable part is moved in the forward direction, and decides a position of the movable part on the basis of the binary signals corresponding to the characteristic arrangement pattern in the backward direction in the detection area of the backward direction position when the movable part is moved in the backward direction.

11. The image forming apparatus according to claim 10, wherein
the image reading device further includes a drive controlling part controlling the drive source,
the detection area of the backward direction position is located at one end side of the movement range of the movable part, and the detection area of the forward direction position is located at another end side of the movement range of the movable part,
the movement deciding part decides arrival of the movable part at the one end side of the movement range on the basis of the binary signals corresponding to the characteristic arrangement pattern in the backward direction in the detection area of the backward direction position when the movable part is moved in the backward direction, and decides arrival of the movable part at the other end side of the movement range on the basis of the binary signals corresponding to the characteristic arrangement pattern in the forward direction in the detection area of the forward direction position when the movable part is moved in the forward direction, and
the drive controlling part controls the drive source to change movement direction of the movable part from the backward direction to the forward direction when the decision result of the movement deciding part indicates the arrival of the movable part at the one end side of the movement range, and controls the drive source to change movement direction of the movable part from the forward direction to the backward direction when the decision result indicates the arrival of the movable part at the other end side of the movement range.

12. The image forming apparatus according to claim 8, wherein
the reflection control part includes a long-sized member in which a plurality of slits or holes are formed, and, in the member, each part with the formed slit or hole acts as one of the first reflection part and second reflection part, and each part without the formed slit or hole acts as another of the first reflection part and second reflection part.

13. The image forming apparatus according to claim 8, wherein the reflection control part is constituted of a member having a smaller reflectance than a bottom board of the housing and including the first reflection parts and second reflection parts.

14. The image forming apparatus according to claim 8, wherein the reflection control part has the first reflection parts and second reflection parts arranged in an arrangement pattern so that the binary signals generated by the signal generating part becomes a home position standard value when the movable part is positioned at a home position.

* * * * *